United States Patent [19]

Rodi et al.

[11] Patent Number: 4,713,593

[45] Date of Patent: Dec. 15, 1987

[54] METHOD AND DEVICE FOR DETERMINING THE OPERATING CONDITION OR STATUS OF AN ACTUATING OR ADJUSTING DRIVE OF A PRINTING MACHINE

[75] Inventors: Anton Rodi, Leimen; Peter Blaser, Dielheim, both of Fed. Rep. of Germany

[73] Assignee: Heidelberger Druckmaschinen AG, Heidelberg, Fed. Rep. of Germany

[21] Appl. No.: 752,077

[22] Filed: Jul. 3, 1985

[30] Foreign Application Priority Data

Jul. 3, 1984 [DE] Fed. Rep. of Germany ....... 3424349

[51] Int. Cl.⁴ ........................ G05B 19/25; B41F 31/00

[52] U.S. Cl. .................................... 318/572; 318/565; 318/600; 101/365

[58] Field of Search ...................... 318/8, 9, 10, 11, 12, 318/15, 432, 433, 671, 672, 675, 676, 677, 565, 569, 572, 600; 101/365

[56] References Cited

U.S. PATENT DOCUMENTS

| | | | |
|---|---|---|---|
| 2,530,750 | 11/1950 | Yardeny et al. | 318/675 |
| 2,729,774 | 1/1956 | Steele | 318/675 |
| 3,149,271 | 9/1964 | Smith | 318/672 X |
| 3,719,878 | 3/1973 | Ferguson et al. | 318/565 |
| 4,055,788 | 10/1977 | Geeley | 318/677 X |
| 4,149,463 | 4/1979 | Kobayashi et al. | 101/365 X |
| 4,232,259 | 11/1980 | Kaieda et al. | 318/677 X |
| 4,527,477 | 7/1985 | Galster et al. | 101/365 |
| 4,551,808 | 11/1985 | Smith et al. | 318/565 X |
| 4,573,410 | 3/1986 | Blasius et al. | 101/365 |

FOREIGN PATENT DOCUMENTS

| | | | |
|---|---|---|---|
| 56-22107 | 3/1981 | Japan | 318/572 |

*Primary Examiner*—Bentsu Ro

*Attorney, Agent, or Firm*—Herbert L. Lerner; Laurence A. Greenberg

[57] ABSTRACT

A method of determining an operating status of an adjusting drive of a printing machine having an electric motor drivable with varying direction of rotation, and a gear transmission arrangement includes determining a value of at least one of a torque produced by the electric motor and a variable dependent upon the torque, comparing the value with a corresponding value existing during an adjustment of the adjusting drive in a constant direction, and applying the value for a torque deviating by a given threshold value from the torque occurring during the adjustment of the adjusting drive in the constant direction as a criterion for an operating status deviating from the adjustment on the constant direction.

12 Claims, 7 Drawing Figures

69
68
67
57
59
64
79
78
77
160
72
70
71
47
75
AND
74
AND
76
73
RS FF
63
162
83
61
81
56
A D
86
85
87
88
91
84
89
90
92
93
94
55
97
53
98
12
54
99
95
36
96

METHOD AND DEVICE FOR DETERMINING THE OPERATING CONDITION OR STATUS OF AN ACTUATING OR ADJUSTING DRIVE OF A PRINTING MACHINE

The invention relates to a method and device for determining the operating condition or status of an actuating or adjusting drive of a printing machine, in particular an offset printing machine, the actuating or adjusting drive having an electric motor drivable with varying directions of rotation, and a gear or transmission arrangement, preferably a spindle drive.

Such types of adjusting drives are commonly used in a printing machine, for example, for adjusting the thickness profile of the ink layer in the inking device of an offset printing machine. These types of adjusting drives are coupled with a remote position indicator or transmitter so that, by means thereof, the actual position of the adjusting drive can be recorded or determined. In the case of a linearly disposable ink blade, for example, when the adjusting drive has moved the ink blade into a stop position, in which the thickness of the ink gap amounts to zero, this position of the adjusting drive, which can vary as the result of wear phenomena, is assigned a given value (preferably zero) which, as the result of wear observed over a longer period of time, will not continuously occur at one and the same position of the remote position indicator or transmitter and, in other cases, as the result of play in the gear arrangement or transmission, deviations can occur between the position signalled by the remote position indicator or transmitter and the actual position of the adjusting drive.

It is an object of the invention to provide a method and device of the foregoing general type which permits, at least in conjunction with further process steps or devices, the retention of the setting or adjusting accuracy of the actuating drive even when wear occurs.

With the foregoing and other objects in view, there is provided, in accordance with the invention, a method of determining an operating status of an adjusting drive of a printing machine having an electric motor drivable with varying direction of rotation, and a gear transmission arrangement, which comprises determining a value of at least one of a torque produced by the electric motor and a variable dependent upon the torque, comparing the value with a corresponding value existing during an adjustment of the adjusting drive in a constant direction, and applying the value for a torque deviating by a given threshold value from the torque occurring during the adjustment of the adjusting drive in the constant direction as a criterion for an operating status deviating from the adjustment in the constant direction.

In accordance with another feature of the invention, the electrical variable dependent on the torque is preferably the current or power consumed (drawn) by the electric motor.

In accordance with the method of the invention, tests are conducted as to whether the torque supplied by the motor deviates by a given threshold value from the torque which the motor produces during normal adjustment of the actuating or adjusting drive. It should be noted in this case that the normal adjustment procedure refers to the situation wherein the adjusting drive is moved, that is, it is not moved against a stop, and that the electric motor is not at this moment simply overcoming the play in the gear arrangement, as is generally the case during a brief period of time when the motor changes its direction of rotation.

The invention is based upon the realization that the recording or determination of the operating status of the actuating or adjusting drive, for example, determining whether, with current supplied for a given direction of rotation, the electric motor need overcome, at this instant of time, only a relatively small braking torque (while overcoming gear play) or whether the electric motor must overcome a braking torque in the medium range, as is characteristic for adjusting the adjusting drive in a constant direction, can be used to provide the possibility of enabling a precise indication of the position of the individual adjusting drives. Wear and/or play in the adjusting drive or in the parts moved by the adjusting drive, for example, wear of the ink blade, do not effect the accuracy of the measurement.

If necessary, further variables or values can be decisive for determining the operating status, for example, the direction of rotation in which the electric motor is driven.

In German Pat. No. 29 35 489, a device is known in which the influence of a differing degree of sensitivity of sensors which record or determine the position of the adjusting elements for an ink blade, and the influence of a deviation of the position indicated by the sensors for the elements of the ink blade from the zero value whereat the ink layer thickness is zero, can be taken into account. In the case of the heretofore known device, it is necessary for this purpose to adjust the adjusting elements of the ink blade to a layer thickness of zero, on the one hand, and to a predetermined ink-layer thickness, on the other. However, no details are specified in the publication as to how this adjustment is carried out and how the fact is determined that an ink layer thickness of zero is reached.

An advantage of the invention lies in the fact that play in the gear arrangement or transmission can be compensated for during evaluation of the signals provided by the remote position indicator or transmission, rendering it unnecessary to attempt to reduce the play in the gear arrangement to zero by means of suitable constructions. On the contrary, the play in the gear arrangement, particularly in the case of a threaded spindle, can be made greater than is normally the case in order to provide reliable protection against the gear arrangement becoming stiff as the result of abrasion or other dirt particles. This also avoids any necessity for over-dimensioning the motor.

Servomotors in printing machines are often constructed in the form of d-c motors with a field magnet formed by a permanent magnet. These types of motors operate as externally excited d-c motors or electric shunt motors when connected to a constant d-c voltage. In these types of motors, the motor current is strongly dependent on the torque, it being linearly dependent in the ideal case. Also, the rotational speed is dependent on the produced torque, however, to a lesser extent. On the other hand, speed is strongly dependent on the produced torque in the case of series motors which are, however, used only in rare cases for this application. In this way, the speed of the electric motor can also be used, depending on the application, as a variable dependent on the torque produced. In the embodiment, an electrical variable dependent on torque is used, i.e. the motor current. However, the time rate of change of the motor current i.e. the first derivative of the motor current with respect to time, can also be used for example as the torque-dependent variable.

In one mode of the method according to the invention, steps are employed which include applying an excess value of a torque exceeding by a given threshold value the torque occuring during adjustment of the adjusting drive in the constant direction, as a criterion for stopping the adjusting drive despite the supply of power to the electric motor. For this purpose, the threshold is set suitably high so that any increased frictional forces, which may occur do not cause the threshold value to be exceeded, but rather the threshold value is exceeded only when the actuating or adjusting drive is at a standstill. In such a case, the electric motor generally consumes a multiple of the current as compared to the amount of current it consumes during the normal adjusting procedure.

In another mode of the invention which can also be implemented together with the mode which has just been described, the method includes applying a value short of a torque falling by a given threshold value short of the torque occuring during adjustment of the adjusting drive in the constant direction, as a criterion for an operating status of the adjusting drive wherein gear play of the adjusting drive is overcome with the electric motor running. Particular care must be taken, when torque fluctuations can occur during the normal adjustment procedure, to ensure that the torque which occurs when overcoming the idle travel can be differential to an adequate extent from the torque occuring during normal adjustment of the adjusting drive, making it possible to distinguish the two operating statuses clearly. The last-described mode makes it possible, particularly during the reversal of the direction of rotation of the drive motor, to determine when the torque again assumes its value corresponding to the normal adjustment procedure, therefore making it possible to evaluate the position signals of the remote position indicator or transmitter in an appropriate manner. If, for example, the remote position indicator includes an increment transmitter, for example, which simply sends pulse signals representing a rotation through a given angle value, then the method can be arranged in such a way that the evaluation of these pulse signals is begun only after the electric motor produces its normal torque. Rotation of the remote position indicator or transmitter, while overcoming the idle travel of the gear arrangement therefore remains unconsidered.

When several interconnected transmission elements with play, for example, rods, shafts, threaded spindles, and the like are disposed between the shaft of the electric motor and the adjusting element, such as the ink blade segment, for example, and also, for example, when at least one of the shafts is specially mounted, then, following a reversal of the direction of rotation of the electric motor, the torque to be produced by this reversal increases stepwise until it has reached the torque which is characteristic for uniform adjustment of the adjusting drive in a continuous direction. In this case, the threshold value must be determined in such a way that the operating status of the adjustment in a continuous direction can still be clearly recognized. In addition, play between various transmission elements can result in the occurrence of short-term relatively low current peaks, caused by the acceleration of the individual transmission elements during start-up of the electric In accordance with the device for performing the method of the invention namely for determining an operating status of an adjusting drive of a printing machine having an electric motor drivable with varying direction of rotation, and a gear transmission arrangement, comprising means for determining a value of at least one of a torque produced by the electric motor and a variable dependent upon the torque, and evaluating means responsive to a variation in the value for the torque exceeding a given threshold value and for controlling entry into a memory of a position of the adjusting drive determined by a remote position transmitter.

The stored position of the remote position indicator or transmitter should ideally represent the actual position of the remote position transmitter either as a result of its construction, as is the case of a linear potentiometer acting as a remote position transmitter, or by means of additional devices. The change in torque on which the evaluation is based normally has a step-type progression. The advantage of the device according to the invention lies in the fact that it enables the position of the remote position indicator (or transmitter) stored in the memory to be used for correction purposes. The stored position can be made visible, for example, by means of a display at the printing machine and, through this display means, a technician or the printer can recognize at which indicated value the adjusting drive has reached a mechanically defined end position. This indicated value can then be considered either on a purely numerical basis or the indicated value can be set to zero, for example, by adjusting the remote position indicator or transmitter.

In accordance with a further feature of the invention the electric motor has a shaft connected to a part of the position transmitter, the position transmitter being formed of two parts, mutually rotatable relative to one another, the other part of the position transmitter having a limited pivoting capability, the value determining means comprising electronic circuitry, the position transmitter and the electronic circuitry having means for generating respective position signals and signals characterizing a variation in the operating status of the adjusting drive, evaluating means for receiving the signals and transmitting a signal whenever a pivot angle of the other part of the position transmitter deviates from an angle of rotation traversed by the shaft of the electric motor in order to overcome play in the adjusting drive. These signals can then serve as an indication to a technician that he must adjust the pivot angle within which the other part of the remote signal indicator or transmitter can swivel until the signal disappears.

In accordance with an additional feature of the invention, the electronic circuitry for determining the value for the torque is of such construction that the signals generated by the generating means thereof are characteristic at least for the direction in which stops limiting the angular travel of the other part of the position transmitter e.g. the potentiometer housing must be adjusted in order to eliminate any difference between the play in the position transmitter shaft and the angular pivot path of the position transmitter. This signal also provides the technician with guidance for performing his adjustment work.

The remote position indicator can, for example, include a potentiometer with the potentiometer shaft being used to transmit the torque from the electric motor to the adjusting element. Preferably, the potentishaft completely free of play. If there is play, it must be less than the total play in the region between the remote position indicator or transmitter and the adjusting element. The amount of play in the total transmission path from the electric motor to the actuating element has no effect on the measuring accuracy.

In accordance with another feature of the invention, means are provided for automatically connecting the pivot angle of the other part of the remote position indicator (or transmitter) so that it is not absolutely necessary for the technician to intervene, and exact agreement of the remote position indicator (or transmitter) display with the actual position of the adjusting drive is always assured.

In accordance with a concomitant feature of the invention the position determined by the position transmitter for a given direction of rotation of the electric motor at a torque exceeding no-load torque is indicated as a true position of the adjusting drive and, in case the direction of rotation is opposite the given direction, the position determined by the position transmitter is corrected by an amount corresponding to idle travel of the adjusting drive, and includes means for determining the idle travel which, with the electric motor being in a mode of operation selected from load operation and blocking operation in the given direction of rotation, determines a change in an output value of the position transmitter, occurring during reversal of the direction of rotation between the time at which the direction of rotation has been reversed and the time at which the load torque has been reached, and stores the output value change in the memory. The advantage of this construction lies in the fact that the housing of the remote position transmitter can be firmly mounted and the idle path is still automatically taken into consideration.

Other features which are considered as characteristic for the invention are set forth in the appended claims.

Although the invention is illustrated and described herein as embodied in a method and device for determining the operating condition or status of an adjusting drive of a printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
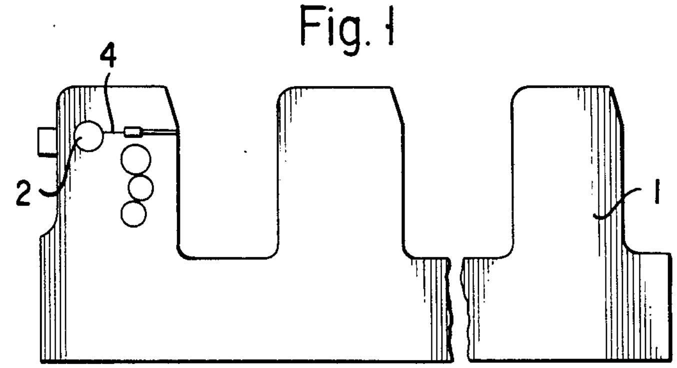
FIG. 1 is a diagrammatic view of an offset printing machine with several inking units.

Referring now to the drawing and first, particularly, to FIG. 1 thereof, there is shown therein only one ductor roller 2 of an inking device out of the great number of drums and rollers usually found in a printing machine. Printing ink is fed to the ductor roller 2, and the thickness of the ink film formed on the ductor roller 2 is determined by the spacing of a total of 32 ink blade segments 4 from the ductor roller 2 so that the thickness of the liquid ink film on the ductor roller 2 can be adjusted to the required value over the length of the ductor roller.

Each ink blade 4 (FIG. 2) is driven by its own electric motor 6 having a shaft 8 connected, with play (through a tongue-and-groove connection), with the one end of a potentiometer spindle 10 which is part of a spindle potentiometer 12, and the other end of the potentiometer spindle 10 is connected, likewise with play, to a shaft 14 which carries at its other end a threaded spindle 16 which is engaged in a threaded bore formed in a guide piece 20 which is secured to the ink blade 4. There is play between the threaded spindle 16 and the defining surface of the threaded bore 18. Depending upon the drive direction of the electric motor 6, the actuating drive moves the ink blade 4 either in direction towards or away from the ductor roller 2. Due to the play between the threaded spindle 16 and the defining surface of the threaded bore 18, the longitudinal movement of the ink blade 4 does not exactly follow the rotation of the electric motor 6 during reversal of the rotational direction of the electric motor 6.

Figure 3:
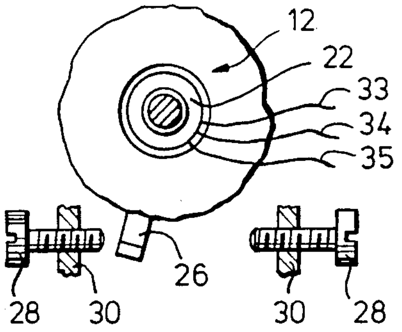
FIG. 3 is a partly fragmentary, cross-sectional view of FIG. 2 taken along the line III—III and showing a moving housing mount of a spindle potentiometer forming part of the invention.

The housing 22 of the spindle potentiometer 12 is mounted in such a way that it can turn about the longitudinal axis thereof. The angle of rotation of the housing 22 is restricted in that a radially projected arm 26 located on the housing 22 engages between two variable stops formed by adjusting screws 28 (FIG. 3) which are screwed into threaded bores formed in locally fixed bearing parts 30. The aim is to adjust the adjusting screws 28 in such a way that the angle of rotation of the housing precisely corresponds to the angle of rotation which occurs as the result of the play between the threaded spindle 16 and the threaded bore 18 and between the threaded spindle 16 and the potentiometer spindle 10. The pivot angle of the arm 26 is then precisely the same size as the angle of rotation of the shaft 14 through which this shaft 14 can turn through in the opposite direction of rotation after driving over a long period of time in one direction of rotation until the guide piece 20 moves in the opposite direction after overcoming the aforementioned play. In this embodiment of the invention, the play is approximately 40°.

If the play of the arm 26 is, in fact, precisely the same amount as the total play of the threaded spindle 16 in the bore 18 and the coupling between the potentiometer spindle 10 and the threaded spindle 16, the result is that, after a reversal of the direction of rotation of the electric motor 6, a small relative movement also occurs in the potentiometer spindle 10 and the housing 22 during the time in which the ink blade 4 does not move due to the play between the threaded spindle 16 and the defining surface of the threaded bore 18, because the housing 22 turns due to frictional forces acting between the potentiometer spindle 10 and the housing 22. For this reason, the voltage produced by the spindle potentiometer 12 does not change during the time in which the arm 26 swivels.

Three terminals 33 to 35 of the spindle potentiometer 12 are connected to inputs of electronic circuitry 40, and terminals of a resistor 36 connected in the power supply line to the electric motor 6 are connected to other terminals of the electronic circuitry 40. The electrical voltage at this resistor 36 is a measure of the current consumed by the motor 6 and of the torque produced by the motor 6. The electronic circuitry 40 sends, a digitized electrical signal via a number of parallel lines 42 to a control unit 46 which, in turn, is connected to a keyboard 48.

Figure 2:
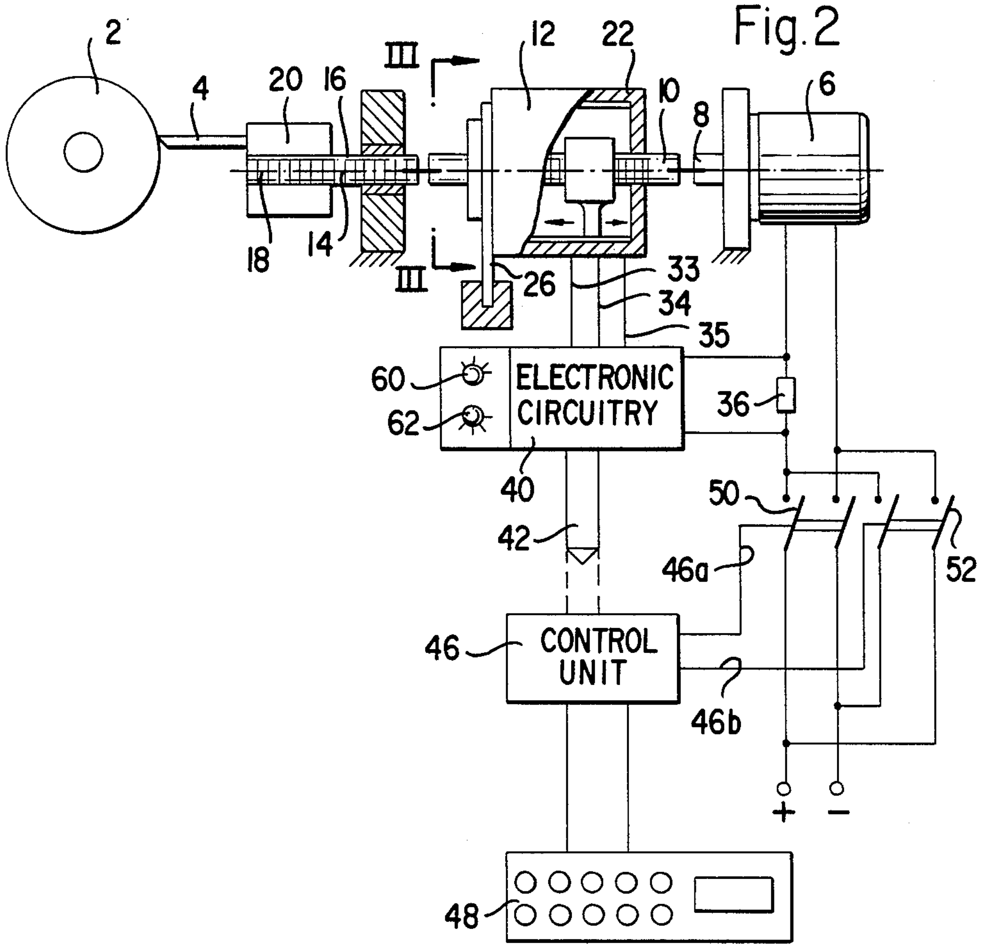
FIG. 2 shows a schematic and diagrammatic view of an individual actuating drive for adjusting the thickness profile of the ink layer in a single zone of an offset printing machine.

By means of the keyboard 48, the printer can enter data into the control unit 46, and the control unit 46 initiates adjustment of the ink blades 4 of the printing machine in the various printing units thereof to the required value and thereby controls as required, respectively, the various electric motors 6 in the respective required direction of rotation. In this respect, electrically actuatable switches 50 and 52 are indicated in FIG. 2 which are represented as mechanical switches in the drawing although they can also be constructed as electronic switches. The control unit 46 with its keyboard 48 and the switches 50 and 52 do not form any part of this invention. A machine with these types of control units is described in German Published Non-Prosecuted Application No. (DE-OS) 31 12 189. The entire contents of this reference is accordingly incorporated in the instant application.

Through the use of the aforesaid potentiometer 12 having a rotatable housing 22, the electronic circuitry 40, the signal representing the instantaneous position of the ink blade 4 is sent to the control unit 46, whereby the play between the threaded spindle 16 and the surface defining the threaded bore 18 as well as the potentiometer 12, has been eliminated from the signal. Therefore, the measured value provided by the electronic circuitry 40 will at all times precisely correspond to the thickness of the ink layer, independently of the wear which occurs in the vicinity of the face of the ink blade 4 pointing towards the ductor roller 2 and in the threaded spindle 16.

Figure 4:
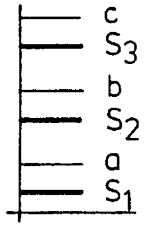
FIG. 4 is a graphic representation of the various voltage thresholds for the device of FIG. 2.

The operating condition or status of the electric motor 6 is shown in FIG. 4 which is a graphic representation indicating the current values which flows through the electric motor 6 and which passes through the resistor 36 for detecting the various operating conditions by the electronic circuitry 40, connected thereto. During no-load operation, a relatively low current is used (value a), during normal operation i.e. while the guide piece 20 is moving, a larger current, namely the working current, is flowing (value b) and, when the rotation of the shaft 8 is blocked as a result of the ink blade 4 making contact with the ductor roller 2, an even larger blocking current (value c) is required. The electronic circuitry 40 contains threshold value circuits which form the threshold values S1, S2 and S3 and, when the threshold value S3 is exceeded, this indicates that the blocking current has occurred. If the threshold value S3 is not exceeded but the threshold value S2 has, then this is interpreted as the normal operating condition or status of the electric motor 6, and when only the threshold value S1 is exceeded, this is interpreted as the no-load status of the motor. If none of the threshold values are exceeded, then this is interpreted as a situation wherein no current is supplied to the electric motor 6 and it is therefore stationary.

The electronic circuitry 40 is constructed in such a way that, when it recognizes that the threshold value S3 has been exceeded i.e. the occurrence of the blocking current, it always stores as a measured value in a memory the value which, at that instant is provided by the linear spindle potentiometer 12. For this purpose, the measured value in the form of an analog variable i.e. as a d-c voltage between the terminals 33 and 34 is converted into a digital value by an analog-digital converter 54 (FIG. 6) contained in the electronic circuitry 40 and stored in a register. This stored value is then continuously deducted from the respective value provided by the spindle potentiometer 12 and digitized by the same analog-digital converter, with the resulting difference acting as a new measure for the distance between the ink blade 4 and the ductor roller 2, disregarding any possible errors as the result of play in the spindle gear or transmission 16, 18.

The last-mentioned play does not affect the accuracy of the value indicated by the spindle potentiometer when, as already described hereinabove, the pivot path of the arm 26 is precisely the same size as the angle of rotation of the shaft 14 which is necessary in order to overcome the play in the spindle drive 16, 18.

The electronic circuitry 40 contains a further device to detect whether the last described agreement between the pivot angle of the arm 26 and the actual play actually does exist, or whether the adjusting screws 28 must be readjusted. For this purpose, the position value determined by the spindle potentiometer 12 and digitized is immediately stored when only the threshold value S1 is exceeded by the current of the electric motor 6 when the electric motor 6 is switched on i.e. no-load operation exists. The instant the current used by the electric motor 6 then exceeds the threshold value S2, indicating that the play in the positioning drive has been overcome, the digitized position value defined by the spindle potentiometer 12 is once again determined and compared with the previously mentioned first position value. When the two values agree i.e. the potentiometer spindle 10 has not turned relative to the housing 22 during no-load operation of the motor 6, then the possible pivot angle of the arm 26 is not too small. In order to determine additionally whether the pivot angle of the arm 26 may possibly be too great, a short time (considerably shorter than 1 second) after the threshold value S2 has been exceeded, the digitized position value provided by the spindle potentiometer is once again compared to the stored position value. If the last determined position value then deviates from the stored position value, then this is an indication that, in the interim, the potentiometer spindle 10 has turned relative to the housing 22 i.e. the arm 26 has in the meantime come to rest on one of the adjusting screws 28. On the other hand, if the last determined position value still agrees with the stored position value, this then indicates that the arm 26 has not yet come to rest on one of the adjusting screws 28, and that the pivot angle of the arm 26 limited by the adjusting screws 28 is too great. In this case, an LED 60 is switched on by the electronic circuitry 40, thereby indicating to the service technician that he must reduce the pivot angle of the pivot arm 26 by correspondingly turning one of the two adjusting screws 28. On the other hand, if the procedure described hereinbefore indicates that the pivot angle of the swivel arm 26 is too small, then a different LED 62 lights up, indicating to the technician that he must increase the pivot range of the swivel arm 26 by correspondingly turning one of the screws 28.

It is obvious that, instead of an indication by means of the LEDs 60, 62 or in addition to this type of indication, automatic adjustment of the adjustable stops which limit the pivot angle of the arm 26 is possible. After turning one of the adjusting screws 28, the technician, in the case of the described embodiment, must check once again, by means of an adjustment procedure for the ink blade 4, whether the pivot angle of the pivot arm 26 is then actually correct since the LEDs 60 and 62 only provide an indication as to which direction the pivot angle of the pivot arm 26 must be changed and do not specify the extent to which this pivot angle must be varied. With the aid of FIG. 5, an embodiment of the invention deviating from the embodiment of FIG. 2 is described in which the housing 22 of the spindle potentiometer 12 is fixed. In this case, the play of the spindle drive 16, 18 is eliminated by modified electronic circuitry 40. The zero or null position at which the ink gap has the value zero and, therefore, the ink blade 4 engages the ductor roller 2 is determined in the same way as described hereinabove. As an example, FIG. 5 shows the progression of the motor current values and the potentiometer settings corresponding thereto.

For the following observation, it should be assumed that the value provided by the spindle potentiometer 12 is a precise measure for the position of the ink blade 4 if the motor 6 moves the ink blade 4 in the direction towards the ductor roller 2. A setting of the ink layer thickness to zero has been carried out for this direction of rotation of the motor. By way of definition, play in this direction of rotation of the motor may be disregarded. In this way, any wear in the gear or transmission arrangement 14 and of the end face of the ink blade 4 has no effect on the measuring accuracy, since the position indication can be set to zero as described above at suitable intervals of time, for example, when switching on the printing machine every day. If the motor 6 is switched off during this movement of the ink blade 4 in the direction towards the ductor roller 2, the value characteristic for the position of the ink blade 4 and provided by the spindle potentiometer 12 is stored after being digitized in a memory of the modified electronic circuitry 40. This condition is shown in FIG. 5 at the beginning of the time axis i.e. at the time t0. It is assumed that, at the time t1, the electric motor 6 is switched on in the opposite direction of rotation. At this time, t1, the current to the motor increases from the value zero to the value Io+ which is the no-load current, whereby a short overshoot of the current is shown in FIG. 5 shortly after switch-on. The motor 6 begins to move, initially overcoming only the play in the spindle drive 12. The electronic circuitry 40 determines that the load current has not yet been reached, but that the no-load current value Io+has been reached, and for this reason the output signal of the electronic circuitry is held constant while the output voltage of the spindle potentiometer 12 changes.

Figure 5:
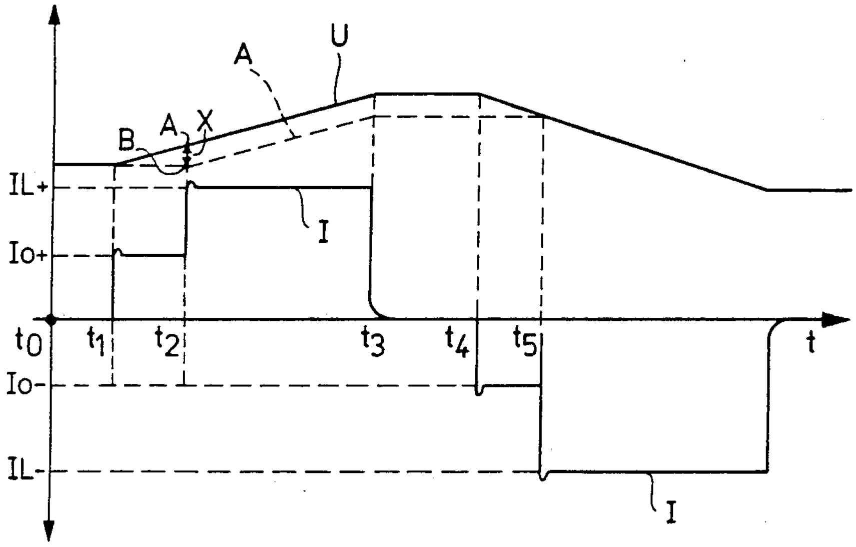
FIG. 5 is a timing diagram for a different embodiment of the invention.

Reference is now made to the line U which shows the output voltage U of the spindle potentiometer in FIG. 5, and the broken line A which represents the output indication A provided by the electronic circuitry 40. Both curves show the same value in the region between the times t0 and t1.

After overcoming (traversing) the play in the spindle drive 10, the motor current increases to the load current IL. This increase is evaluated by the electronic circuitry 40 which then causes the voltage supplied by the potentiometer 12 at this moment to be converted into a position and the difference of the position corresponding to the potentiometer voltage and the position previously stored during standstill of the motor is stored. This is the difference X in FIG. 5 at the time t2. Between the times t2 and t3, the ink blade 4 is shifted at constant speed so that the value U indicated by the potentiometer also changes at a constant rate. The instant value A always remains below the value U by the amount X. At the time t3, the electric motor 6 is switched off so that its current returns to zero. The value U and the value A remain constant during the standstill period between the time t3 and t4. At the time t4, the motor is switched on again in the opposite direction of rotation and is therefore shown with opposite polarity (I0−, IL−), with the potentiometer voltage value U decreasing. The electronic circuitry 40 recognizes that, between the time t4 and t5, only the no-load current is flowing and the indication A which was stored at this time t3 is therefore retained. At time t5, the electronic circuitry 40 recognizes that the idle or no-load path of the motor 6 has been overcome (traversed) since the motor now draws load current. The voltage U provided by the potentiometer 12 is now directly converted to the position of the ink blade 4 and forms the output signal of the electronic circuitry 40. For reasons of simplification, FIG. 5 assumes that play is to be overcome only at one single position in the transmission path between the electric motor 6 and the actuating element i.e. the ink blade 4, namely in the vicinity of the spindle drive 16, 18. The fact has not been taken into consideration that the motor current, for example, increases slightly above the no-load current when the play in the tongue-and-groove connection between the shaft 8 and the potentiometer spindle 10 has been overcome (traversed) and the potentiometer spindle begins to rotate.

Figure 6:
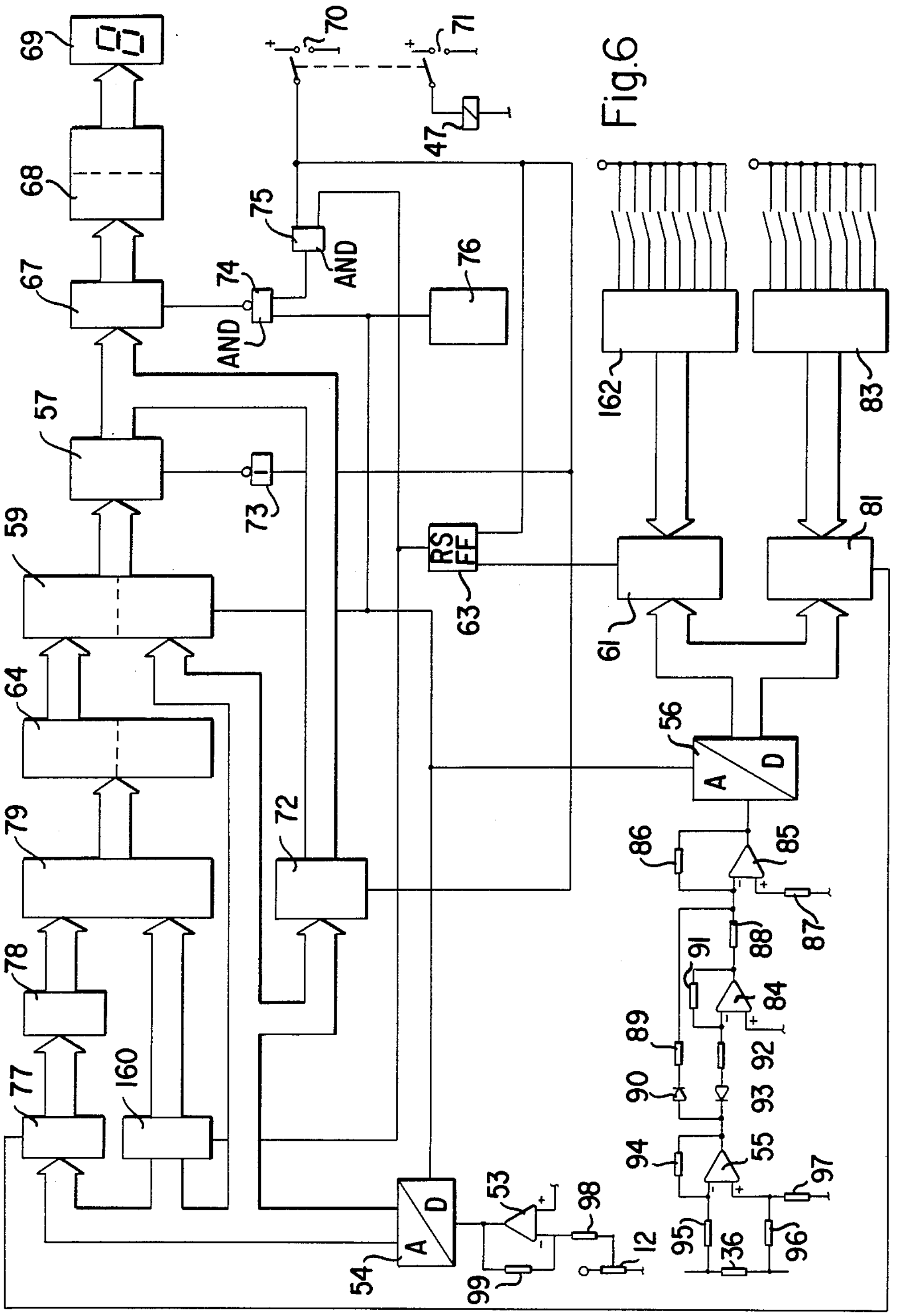
FIG. 6 is a circuit diagram of one embodiment of the control logic system of the invention.

A realization of the control logic system 40, 46, 48 of FIG. 2 is shown in detail in FIG. 6.

A ten-turn helical potentiometer 12 with a linear characteristic curve serves as the spindle potentiometer or position transmitter 12. The output signal is conducted via a linear amplifier 53, having feed-back resistors 98, 99, to the analog-digital converter 54.

The shunt resistor 36 serves together with value detector amplifiers 84, 85 for determining the motor-current value. The voltage drop across resistor 36 is fed via an operational amplifier 55 which is connected with resistors 95, 96, 97 as a differential amplifier, to an analog-digital converter 56 via the aforementioned value detector amplifiers 84, 85. The 8-bit word from the of an A/D converter 54 is fed to an adder 59. The same 8-bit word is fed simultaneously to the register 60 and 77 and stored therein. The digital signal from the A/D converter 56 is compared for equality in the 8-bit comparator 61 with the current threshold value S2 (FIG. 4) set by means of a switch 62. At the moment of equality this signal, the digital value existing at the moment at the input of the register 60 is and stored therein. Heretofore, however, the threshold value S1 (FIG. 4) was obtained via a comparator 81 and a current limiting regulator or switch 83 and the value actually then present at the input to the register 77 was stored therein. This 8-bit word is conducted via an inverter 78 to an adder 79 and substracted from the 8-bit word stored in the register 160 (inverter and adder form a subtractor).

The value from this subtraction is precisely the difference voltage X of the position transmitter 12 (A−B=X[FIG. 5]).

This value must then continuously be subtracted from the instantaneous voltage value of the position transmitter 12 (note FIG. 5, lines U and A). To attain this, the output value of the adder 79 is fed via a complementingstage 64 to a second adder 59 whereat, a subtraction of the value X from the data from the A/D converter 54, occurs.

The value from this second subtraction is fed via bus line driver 57 and a register 67, which continuously transmits data to a 7-segment display decoder 68, which indicates the correct position of the ink blade segment 4 (FIG. 2) on a 7-segment display 69.

The course of the operation heretofore described to this point corresponds in FIG. 5 to the time span t0–t4. The switches 70 and 71 of relay 47 serve for switching-over the direction of rotation of the motor 6 (FIG. 2) via the contacts 52 and 50 of polarity reversing relay 47 (FIG. 2). The switch 70 gives the corresponding signal during the switch-over of the rotational direction of the motor. The RS flip-flop 63 is therewith reset, and the digital values from the A/D converter 54 are fed, via the bus line driver 72, directly to the register 67.

The bus line drivers 72 and 57 are selectively opened and closed, respectively, during the switch-over at 70 via the inverter 73.

In order to maintain the last value for voltage U for the time t4 (FIG. 5) to t5 (FIG. 5), the register 67 is blocked by the gate 74 via gate 75 until the RS flip-flop 63 has been set with the aid of the comparator 61 through the increase in the amount of current at the time t5 and stops the system clock 76 output to the register 67, so that the values are passed on further to the 7-segment decoder 68 and delivered to the display 69. The clock generator also simultaneously transmits the system clock for adders 59, 79 to the registers 160, 77 and the A/D converters 54 and 56.

Figure 7:
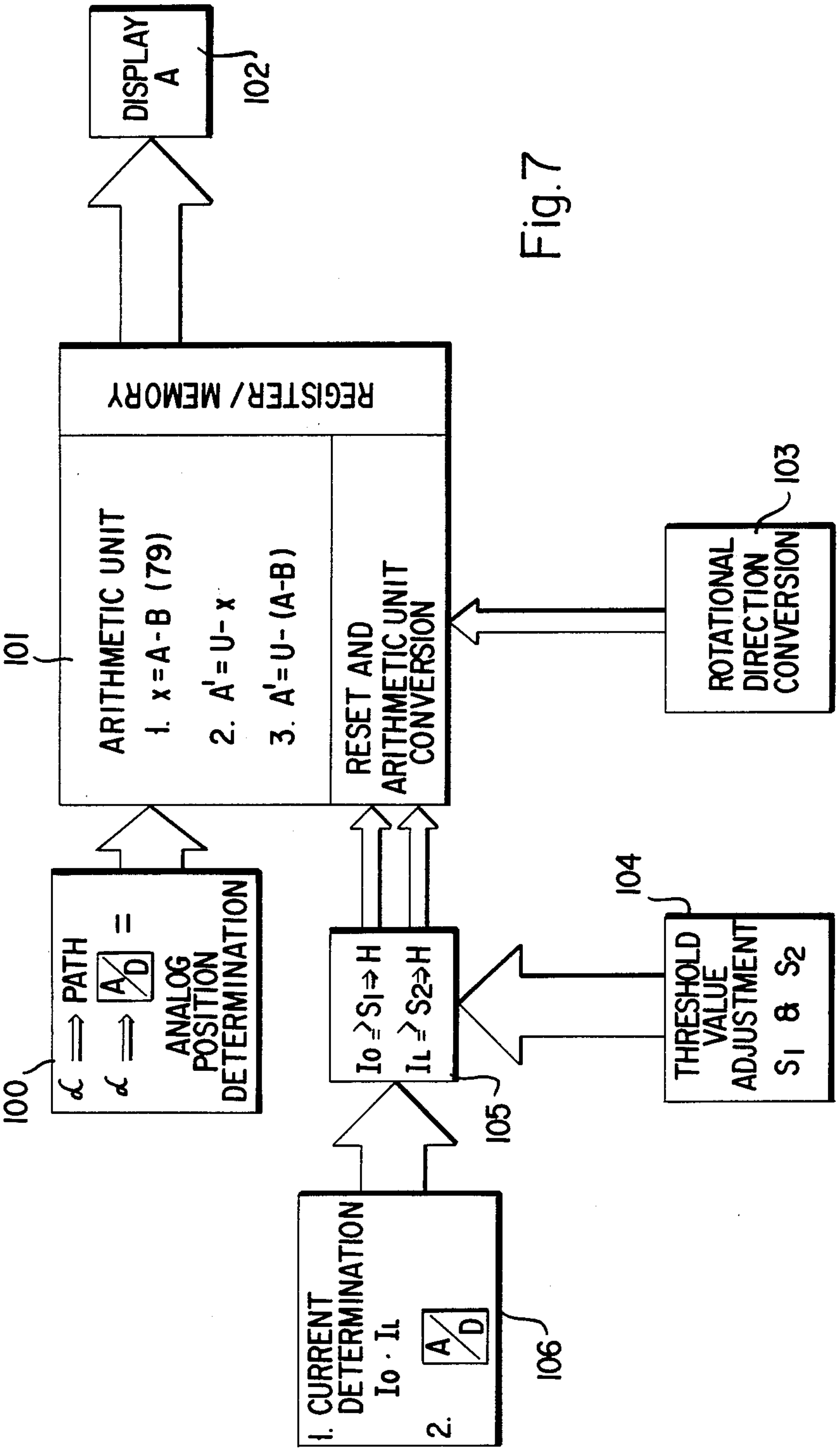
FIG. 7 is a block diagram of the control logic system.

FIG. 7 shows the individual function blocks of the control logic system 40, 46, 48 (FIG. 2) and represents a summary of FIG. 6.

In block 100, the setting of the potentiometer 12 and the adjusting member, respectively, are recognized and converted to digital signals (FIG. 6: components 12, 98, 53, 99, 54). The block 106 determines the actual current value (FIG. 5: Io, Ib) and converts it into binary signals (FIG. 6: components 36, 96, 95, 97, 94, 55, 90, 89, 93, 92, 91, 84, 88, 87, 85, 86).

The current threshold values S1, S2 are set in block 104 (FIG. 6: components 62, 83).

In the comparator stage 105, the control signals for the arithmetic unit are generated (FIG. 6: components 61, 81).

In the arithmetic unit 101, the signals from the components 100, 105 and 103 are processed in accordance with the conditions in FIG. 5 and in accordance with the equation: A′=−A+B (components 77, 60, 78, 79, 64, 59).

From t5 (FIG. 5) on, a switch-over to A′=U (note FIG. 5) occurs via the rotational direction conversion 103 (FIG. 6: components 70, 71, 75, 46) and the adder conversion in 101 (components 70, 71, 63, 72, 73, 57, 74, 75). In the display 102 (FIG. 6: components 68, 69), the value A′ is continuously displayed, and from t5 (FIG. 5) the value U is displayed.

Components which may be used for realizing the circuit shown in the schematic diagram of FIG. 6 are as follows:

| Components | Type | Number | Manufacturer |
|---|---|---|---|
| 57, 72 | bus transceiver | SN74LS645 | Texas Instruments |
| 160, 67, 77 | register | SN74LS299 | Texas Instruments |
| 64 | invert line driver | SN74366A | Texas Instruments |
| 59, 79 | adder | SN74283 | Texas Instruments |
| 73, 78 | inverter | SN7404 | Texas Instruments |
| 74, 75 | AND-gate | SN7408 | Texas Instruments |
| 61, 81 | 8-bit comparator | SN74LS518 | Texas Instruments |
| 63 | flip-flop | SN74115 | Texas Instruments |
| 54, 56 | A/D converter | AD570 | Analog Devices |
| 68 | 7-segment binary-code decoder | SN74LS47 | Texas Instruments |
| | binary-code decoder | SN74185 | Texas Instruments |
| 76 | clock generator | SN74LS5320 | Texas Instruments |
| 69 | 7-segment display | MAN74A436 | Texas Instruments |
| 53, 55 | quadruple operational amplifier | LM324 | Texas Instruments |
| 93, 90 | diode | BAW76 | Texas Instruments |
| 36, 95, 94, 96, 97, 92, 91, 89, 88, 87, 86, 99, 98 | resistance | | Dale |

With the method and the device according to the invention, not only are the adverse effects of actual play on the measuring accuracy avoided, but also the influence on the measuring accuracy of each deviation in the movement of the adjusting element from the movement of the electric motor can be eliminated, for example, also influences due to elastic deformation. If such influences are also to be taken into consideration, it may be desirable to select especially carefully the threshold value which, when exceeded, results in that an adjustment of the actuating drive in the same direction may be assumed.

We claim:

1. Method of determining the position of a printing machine element being movable in a first and an opposite direction and being drivable by an electric motor operable in respective first and opposite directions, and a transmission having a given play therein, for linking the motor with the machine element, the method which comprises: driving the element in its first direction a distance being greater than the play; recording the value of at least one torque-dependent motor variable while the motor traverses the play while driving the element in its first direction as a first torque value; and using the first torque value during subsequent operation of the motor in the opposite direction by comparison of said first torque value with the instant motor variable, for determining the end and the beginning of the play.

2. Method according to claim 1 including a position transmitter coupled to the motor, the method further comprising: monitoring the output of the position transmitter during operation of the machine while first driving the element in said first and next in the opposite direction, and recording the output of said position transmitter as a function of the position of said element at the beginning and the end of the play.

3. Method according to claim 2, wherein said position transmitter is a potentiometer dividing said transmission in a first and a second part, said potentiometer having a movable housing being movable between two adjustable stops and being in operative engagement with one of said transmission parts, and having a sliding contact being in operative engagement with the other transmission part; the method comprising applying a voltage to said potentiometer; adjusting said stops such that the movement of the housing is equal to the play in said transmission; and measuring the potential at said sliding contact as a measurement of the position of said element corrected for said transmission play.

4. Method according to claim 2, further comprising: converting the output of said position transmitter to digital position values; subtracting the digital position value at the beginning of the play from the digital position value at the end of the play, thereby forming the digital value of the play; and subtracting the digital value of the play from the digital position value to form the digital position value corrected for the play.

5. Method according to claim 2, comprising: converting said first torque value to a first digital torque value; recording 1said torque-dependent value after the motor has traversed the play as a second torque value; converting said second torque value to a second digital torque value; stopping the motor and recording the position as a first digital position value; starting the motor in the opposite direction; comparing the torque value while traversing the play in the opposite direction; recording the position value when said torque dependent variable becomes equal to said second digital torque value as a second digital position value; subtracting said second digital position value from said first digital position value, forming a digital value of the play, and forming a corrected position value of the machine element by subtracting said digital value of the play from the digital output of said position transmitter.

6. Device for determining an operating status of a printing machine element being movable in a first and an opposite direction comprising: an electric motor for driving said machine element, in said first and opposite directions; a transmission having a given play for coupling the motor with the machine element; means for recording the value of at least one torque-dependent motor variable while driving the machine element in its first direction as a first value, while the motor traverses the play; and means for comparing said first value with the motor variable during subsequent operation of the motor in the opposite direction, and means responsive to said comparing means for determining the end and beginning of the play.

7. Device according to claim 6, wherein said means for recording include a position transmitter being operatively coupled to said transmission, and said transmitter has an output being a function of the operating status of said machine element.

8. Device according to claim 7 wherein said position transmitter is a potentiometer having a movable housing and a sliding contact, the potentiometer divides the transmission in two parts, one of which is in engagement with the housing and the other with the sliding contact, the housing is movable between two adjustable stops; means for applying voltage to said potentiometer housing; means for adjusting the stops such that the movement of the housing is equal to the play in the transmission, and means for measuring the potential of the sliding contact as a value of the position of said machine element corrected for said transmission play.

9. Device according to claim 8, wherein said potentiometer housing is rotatingly suspended and is angularly rotatable between said two adjustable stops, and means for adjusting said stops so that the angular movement of said potentiometer housing is equal to the play in said transmission.

10. Device according to claim 8, including analog-to-digital converter means for converting said torque-dependent values and said position values into respective digital torque values and digital position values; digital register means for storing digital torque values and digital position values; digital comparator means for comparing the digital torque values while driving said element in the first and opposite direction, thereby determining the digital position values at the beginning and the end of the play; first digital subtraction means for subtracting the digital position value at the beginning of the play from that at the end of the play, forming a digital value of the play; and second digital subtraction means for subtracting the digital value of the play from the digital position value, thereby forming a digital position value corrected for the play.

11. Device according to claim 10, wherein said digital subtraction means include a digital adder having first and second adding inputs and a digital inverter disposed in said first adding input for converting said first adding input to a digitally inverted input, thereby forming the subtraction of the first adding input from said second adding input.

12. Device according to claim 10, including a digital display for displaying the corrected digital position value of said element.

* * * * *